United States Patent
Tsukada et al.

(10) Patent No.: US 12,090,904 B2
(45) Date of Patent: Sep. 17, 2024

(54) SEAT

(71) Applicant: TOYOTA BOSHOKU KABUSHIKI KAISHA, Aichi-ken (JP)

(72) Inventors: Masashi Tsukada, Aichi (JP); Wataru Hayashi, Aichi (JP); Koji Kaneda, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 120 days.

(21) Appl. No.: 17/949,603

(22) Filed: Sep. 21, 2022

(65) Prior Publication Data

US 2023/0111211 A1   Apr. 13, 2023

(30) Foreign Application Priority Data

Sep. 29, 2021   (JP) .................................. 2021-159800

(51) Int. Cl.
   *B60N 2/90*   (2018.01)
   *B60N 2/00*   (2006.01)

(52) U.S. Cl.
   CPC ............. *B60N 2/90* (2018.02); *B60N 2/0022* (2023.08)

(58) Field of Classification Search
   CPC ................................ B60N 2/90; B60N 2/0022
   See application file for complete search history.

(56) References Cited

U.S. PATENT DOCUMENTS

| | | | | |
|---|---|---|---|---|
| 10,449,874 | B2* | 10/2019 | Sugiyama | ............ B60N 2/5816 |
| 10,513,211 | B2* | 12/2019 | Mankame | ................ B60N 2/90 |
| 10,667,755 | B2* | 6/2020 | Ridao Granado | ....... B60N 2/90 |
| 2008/0189053 | A1* | 8/2008 | Breed | .................. B60N 2/0027 |
| | | | | 702/41 |
| 2015/0133804 | A1 | 5/2015 | Sugiyama et al. | |
| 2020/0025702 | A1* | 1/2020 | Kabany | .................. G01L 1/144 |
| 2021/0233368 | A1* | 7/2021 | Mankame | ................ F16F 15/04 |
| 2023/0415614 | A1* | 12/2023 | Ito | .......................... B60K 26/02 |

FOREIGN PATENT DOCUMENTS

JP   2013-220322   10/2013

* cited by examiner

*Primary Examiner* — Philip F Gabler
(74) *Attorney, Agent, or Firm* — Greenblum & Bernstein, P.L.C.

(57) ABSTRACT

A seat provided in a moving body includes: at least one piezoelectric sensor including a first surface located on a side of a body of a sitter and a second surface located opposite the first surface, the piezoelectric sensor configured to sense heartbeat-induced body vibrations of the sitter through the first surface; and at least one supporting member disposed inside a recess which is formed in at least one of a seating surface of the seat and a back surface of the seat, the supporting member supporting the piezoelectric sensor under the second surface of the piezoelectric sensor. A gap is provided in at least part of an area between a surface of the supporting member and an inner wall of the recess so that the surface of the supporting member and the inner wall of the recess do not come into contact with each other.

10 Claims, 6 Drawing Sheets

SEAT

This Nonprovisional application claims priority under 35 U.S.C. § 119 on Patent Application No. 2021-159800 filed in Japan on Sep. 29, 2021, the entire contents of which is hereby incorporated by reference.

TECHNICAL FIELD

The present invention relates to a seat provided in a moving body.

BACKGROUND ART

A seat that is provided with a sensor for acquiring an electric potential of a body and that is capable of measuring a heart rate of a sitter is known as the conventional art. Patent Literature 1 discloses a vehicle seat capable of stably measuring heart rates even in a case where sitters have different physiques.

CITATION LIST

Patent Literature

[Patent Literature 1]
Japanese Patent Application Publication Tokukai No. 2013-220322

SUMMARY OF INVENTION

Technical Problem

However, in the conventional art as described above, vibrations that occur when a moving body such as a vehicle moves mainly affect sensing of heartbeat-induced body vibrations of the sitter and thus lead to a decrease in accuracy of the heart rate measurement.

An aspect of the present disclosure has been made in view of the above-described problem, and it is an object of the present disclosure to, in a case where a piezoelectric sensor provided in a seat of a moving body senses heartbeat-induced body vibrations of a sitter to measure a heart rate of the sitter, prevent the accuracy of the measurement from being decreased by vibration occurring in the moving body.

Solution to Problem

To attain the object, a seat in accordance with an aspect of the present disclosure is a seat provided in a moving body, the seat including: at least one piezoelectric sensor including a first surface located on a side of a body of a sitter and a second surface located opposite the first surface, the piezoelectric sensor configured to sense heartbeat-induced body vibrations of the sitter through the first surface; and at least one supporting member disposed inside a recess which is formed in at least one of a seating surface of the seat and a back surface of the seat, the supporting member supporting the piezoelectric sensor under the second surface of the piezoelectric sensor, wherein a gap is provided in at least part of an area between a surface of the supporting member and an inner wall of the recess so that the surface of the supporting member and the inner wall of the recess do not come into contact with each other.

DESCRIPTION OF EMBODIMENTS

Figure 1:
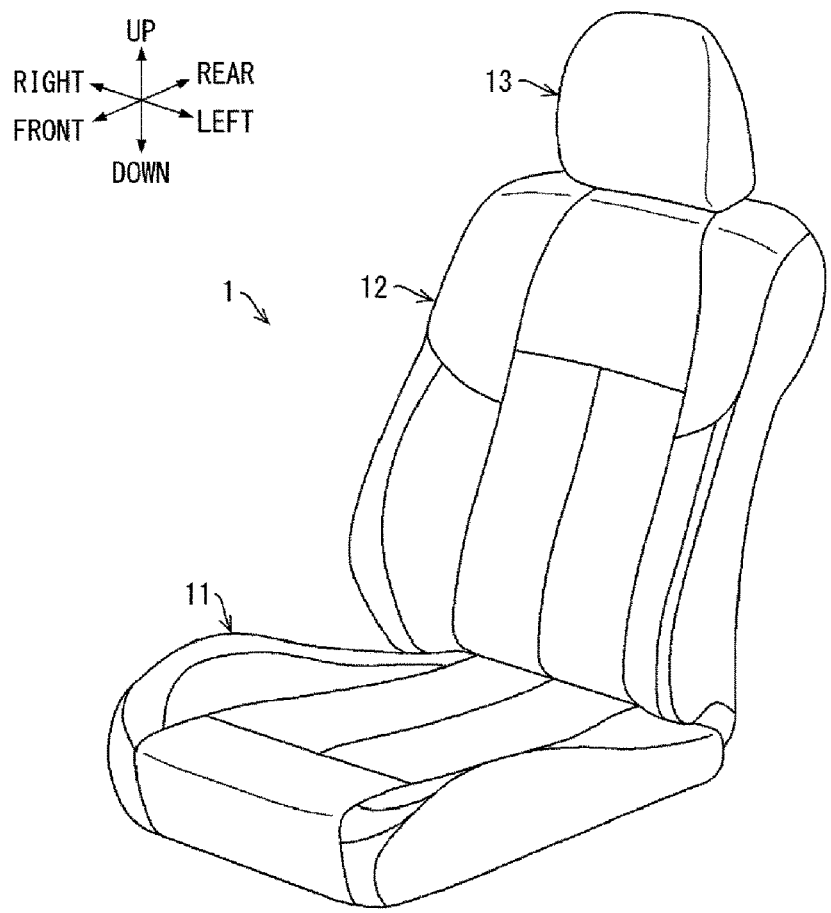
FIG. 1 is a perspective view illustrating an example of an external appearance of a seat provided in a moving body.

The following describes an embodiment of the present disclosure in detail. FIG. 1 is a perspective view illustrating an example of an external appearance of a seat 1 provided in a moving body. The seat 1 includes a seat cushion 11, a seat back 12, and a headrest 13. The seat cushion 11 constitutes a seating surface of the seat 1, and the seat back 12 and the headrest 13 constitute a back surface of the seat 1.

The following description assumes that the moving body is a vehicle. However, the moving body is not limited to a vehicle, and may be a ship, an aircraft, or the like. Further, the seat 1 does not necessarily need to be provided in a driver seat, and may be provided in a passenger seat.

Figure 2:
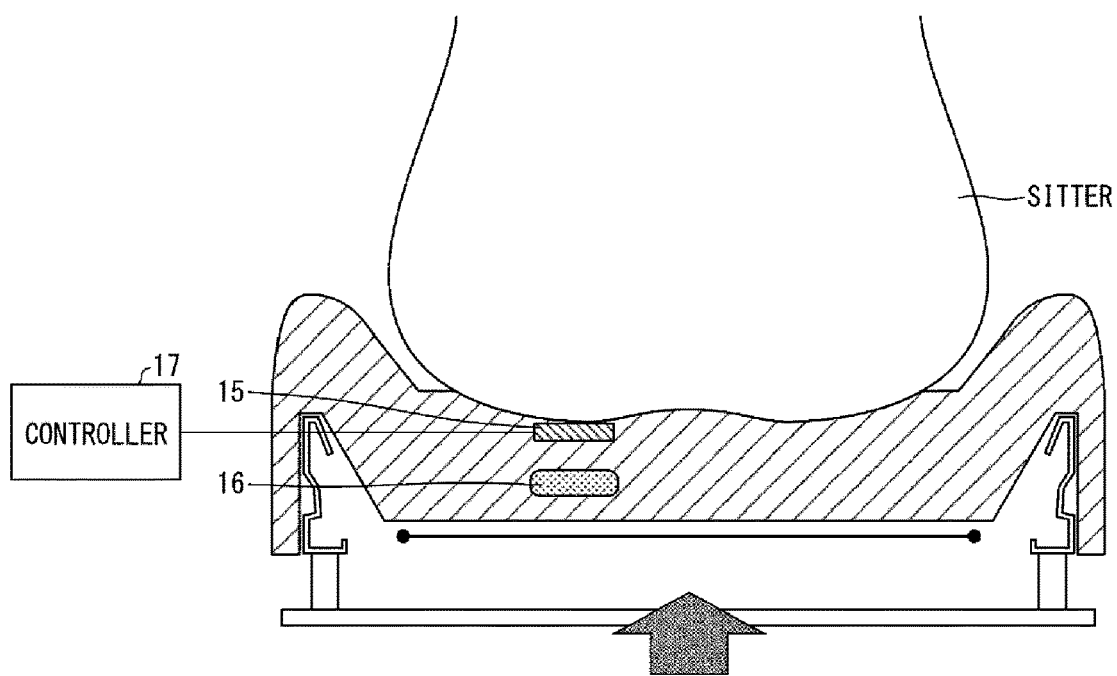
FIG. 2 is a conceptual diagram illustrating an example of a seating surface of a seat.

FIG. 2 is a conceptual diagram illustrating an example of a seating surface of a seat 1. The seat 1 includes a piezoelectric sensor 15 and a vibration-proofing material 16 on the seating surface thereof. FIG. 2 and the following drawings do not illustrate any signal line which is connected to the piezoelectric sensor 15 so that a sensing result from the piezoelectric sensor 15 is transmitted through the signal line. A supporting member for supporting the piezoelectric sensor 15 will be described later with reference to FIG. 4 and other drawings.

The piezoelectric sensor 15 is a sensor that uses a piezoelectric effect of a piezoelectric element which generates a voltage when pressure is applied on the piezoelectric element. The piezoelectric sensor 15, upon receiving a pressure from a hip of a sitter sitting on the seating surface, senses heartbeat-induced body vibrations (ballistocardiogram (BCG)) of the sitter. A controller 17 included in the moving body refers to a sensing result supplied through the signal line to measure a heart rate of the sitter.

The vibration-proofing material 16 is provided below the piezoelectric sensor 15. The vibration-proofing material 16 reduces vibration transmitted from the seating surface to the piezoelectric sensor 15 as compared with a case where the seat 1 does not include the vibration-proofing material 16.

When the moving body moves, vibration from a road surface, as indicated by an arrow in the lower part of the sheet of FIG. 2, is transmitted to the seat 1. In addition, even when the moving body does not move, vibration caused by an engine included in the moving body, vibration caused by wind, and the like vibration may be transmitted to the seat 1. In the following description, the vibrations as described above, which are transmitted from the seating surface to the piezoelectric sensor 15, are also referred to as "vibration noise".

Figure 3:
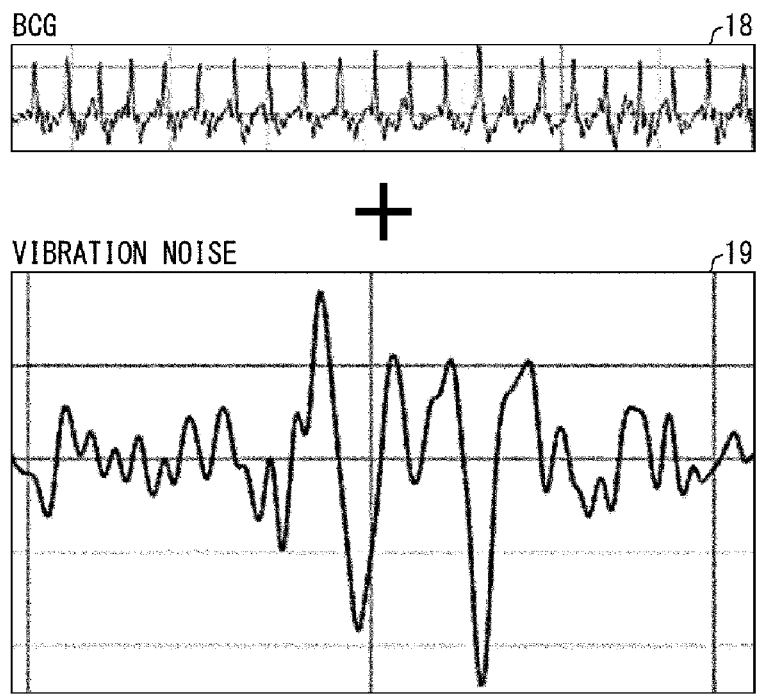
FIG. 3 is a graph showing an example of an electric signal waveform indicating a sensing result from a piezoelectric sensor.

FIG. 3 is a graph showing an example of an electric signal waveform indicating a sensing result from the piezoelectric sensor 15. A waveform diagram 18 in FIG. 3 is an electric signal waveform indicating heartbeat-induced body vibrations at a hip of the sitter. A waveform diagram 19 in FIG. 3 is an electric signal waveform indicating the vibration noise based on the assumption that the seat 1 does not have a configuration of the present disclosure to reduce the vibration noise. In the waveform diagrams 18 and 19, the horizontal axis indicates a time, and the vertical axis indicates a magnitude of the heartbeat-induced body vibrations or the vibration noise. In a configuration of the existing seat, the vibration obtained by combining the vibration shown in the waveform diagram 18 and the vibration shown in the waveform diagram 19 is transmitted to the piezoelectric sensor 15.

The vibration-proofing material 16 reduces the vibration noise shown in the waveform diagram 19, which can be noise when the piezoelectric sensor 15 senses the heartbeat-induced body vibrations shown in the waveform diagram 18, and thus contributes to an improvement in the accuracy with which the piezoelectric sensor 15 measures a heart rate.

Figure 4:
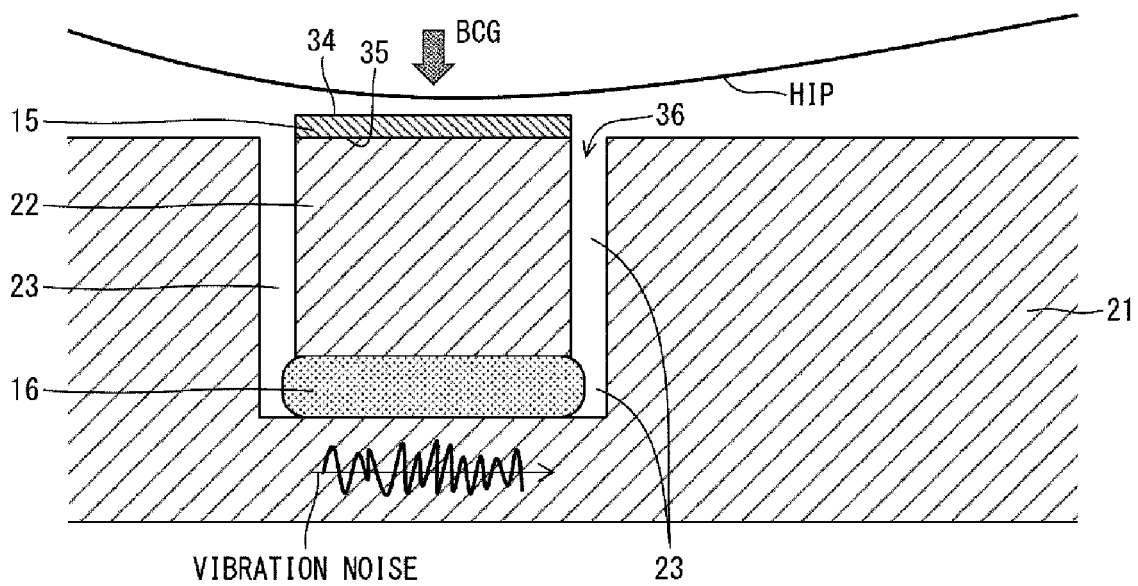
FIG. 4 is a view illustrating an example of a cross-sectional view of a seating surface around a piezoelectric sensor.

FIG. 4 is a view illustrating an example of a cross-sectional view of a seating surface around a piezoelectric sensor 15. In FIG. 4, a pad 21 is a flexible cushion with which a frame of a seat 1 is covered.

As illustrated in FIG. 4, the piezoelectric sensor 15 includes a first surface 34 located on a side of a body of a sitter and a second surface 35 located opposite the first surface 34. Heartbeat-induced body vibrations of a sitter are sensed through the first surface 34 of the piezoelectric sensor 15. In the example illustrated in FIG. 4, the first surface 34 is a top surface of the piezoelectric sensor 15, and the second surface 35 is a bottom surface of the piezoelectric sensor 15. The surface of the pad 21 and the first surface 34 of the piezoelectric sensor 15 are normally covered with leather or the like for the seat 1, but are not necessarily covered with anything.

Further, a supporting member 22 is disposed in a recess 36 of the seating surface such that the first surface 34 of the piezoelectric sensor 15 and the seating surface form a substantially flat surface. This reduces uncomfortableness that the sitter feels when the sitter sits the seat.

The supporting member 22 supports the piezoelectric sensor 15 under the second surface 35. A material of the supporting member 22 is not limited to a specific material, but may be the same as, for example, a material of the pad 21. However, at least a top surface of the supporting member 22 in contact with the piezoelectric sensor 15 desirably has a high rigidity. Further, a plate-shaped member having a high rigidity may be provided between the top surface of the supporting member 22 and the piezoelectric sensor 15.

A gap 23 is provided between the surface of the supporting member 22 and an inner wall of the recess 36 of the seating surface so that the surface of the supporting member 22 and the inner wall of the recess 36 do not come into contact with each other. Especially in this point, the seat 1 in accordance with the present disclosure differs in configuration from the existing seat in which the piezoelectric sensor 15 is simply disposed on a pad.

A groove is formed around the piezoelectric sensor 15 when the configuration of FIG. 4 is viewed from above from a side facing the piezoelectric sensor 15. The gap 23 intercepts vibration transmitted from the pad 21 to the supporting member 22.

Further, a vibration-proofing material 16 that supports the supporting member 22 and prevents vibration from being transmitted from the seating surface to the supporting member 22 is provided in the gap 23 which is located under the bottom of the supporting member 22. Here, an area which is located under the bottom of the supporting member 22 and in which the vibration-proofing material 16 is disposed is also defined as the gap 23, not as the pad 21 or the supporting member 22.

The vibration-proofing material 16 is not limited to a specific kind of vibration-proofing material, but may be constituted by an air spring, a metal coil spring, a vibration-proofing rubber, a rubber pad, cotton, a gel material, or the like. Alternatively, the vibration-proofing material 16 may be a package enclosing a powder and granular material, such as a large number of beads. Particles of the powder and granular material, when subjected to vibration, make minute movements to disperse an impact caused by the vibration, and thus prevent the transmission of the vibration.

As exemplified in FIG. 4, the vibration-proofing material 16, such as an air spring, supports the supporting member 22 on a top surface of the vibration-proofing material 16 which top surface is located opposite a bottom surface thereof that is in contact with the seating surface. However, the package or the like may be shaped such that the surface of the package or the like becomes a flat surface only when an external pressure is applied.

Note that the present disclosure also includes a configuration in which the vibration-proofing material 16 is provided in a gap 23 which differs from the area located under the bottom of the supporting member 22 and a configuration in which the seat 1 does not include the vibration-proofing material 16 and the bottom of the supporting member 22 and the pad 21 are in contact with each other or are integrated with each other.

The vibration-proofing material 16 is not necessarily in contact with the entire bottom surface of the supporting member 22, and, for example, may be configured to support the supporting member 22 through a plurality of contact surfaces where the vibration-proofing material 16 and the supporting member 22 are in contact with each other. Further, a plurality of contact surfaces where the vibration-proofing material 16 and the recess 36 of the seating surface are in contact with each other may be present. In a case where at least one of the contact surface where the vibration-proofing material 16 and the supporting member 22 are in contact with each other and the contact surface where the vibration-proofing material 16 and the recess 36 of the seating surface are in contact with each other is a plurality of contact surfaces, the vibration transmitted from the seating surface to the supporting member 22 is dispersed.

Figure 5:
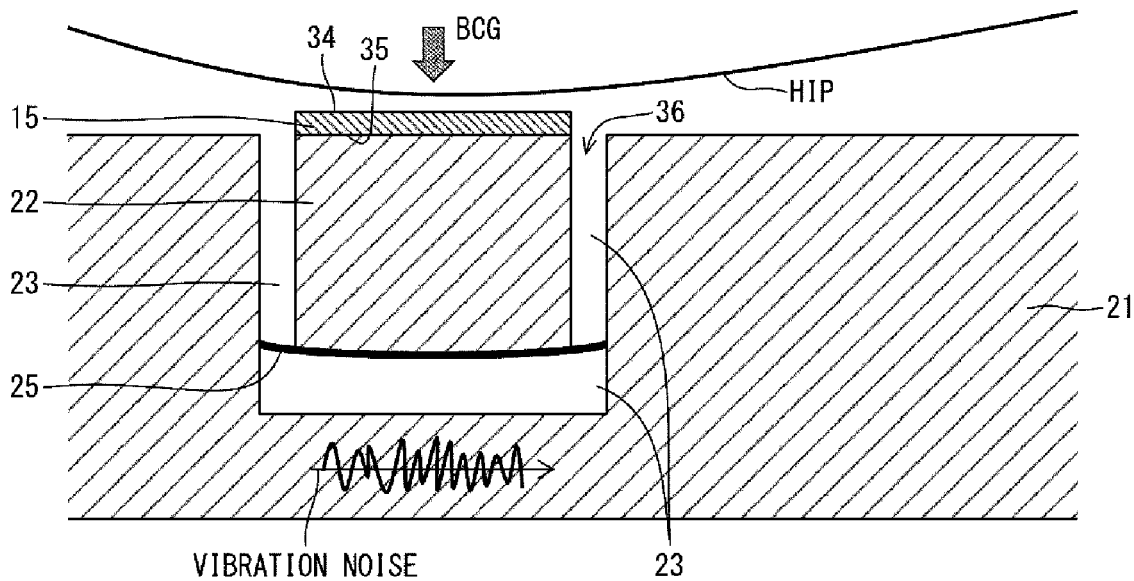
FIG. 5 is a view illustrating an example of a cross-sectional view of a seating surface around a piezoelectric sensor.
Figure 6:
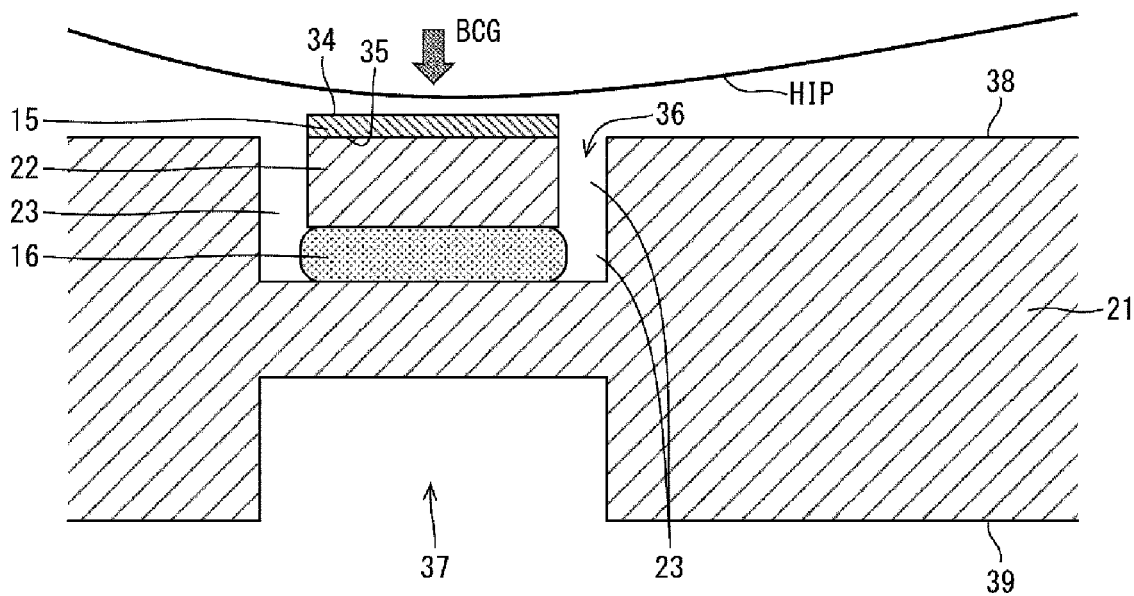
FIG. 6 is a view illustrating an example of a cross-sectional view of a seating surface around a piezoelectric sensor.

FIGS. 5 and 6 are views each illustrating an example of a cross-sectional view of a seating surface around a piezoelectric sensor 15 in accordance with an aspect that differs from the aspect illustrated in FIG. 4. In FIG. 5, a supporting member 22 is disposed on a net 25 stretched between opposite positions of the inner wall of the recess 36 of the seating surface, and is supported by the net 25. In other words, the supporting member 22 is fixed to the net 25, and is suspended inside the recess 36 of the seating surface. The configuration illustrated in FIG. 5 enables further reduction of the vibration transmitted to the supporting member 22 from vertically below the supporting member 22 in the seating surface.

In the cross-sectional view illustrated in FIG. 6, a recess 37 is formed in the bottom surface of the pad 21 in an area located opposite the recess 36 which is formed in the top surface of the pad 21. Note that the recess 37 in the bottom surface of the pad 21 is not necessarily formed in an entire area opposite the recess 36 formed in the top surface thereof. That is, in a configuration illustrated in FIG. 6, assuming that a surface of a seating surface located on a side of a body of a sitter is a first surface 38, and a surface thereof located opposite the first surface 38 is a second surface 39, the supporting member is disposed in a recess 36 of the first surface 38, and a recess 37 is formed on the second surface 39 in at least part of an area located opposite the recess 36 of the first surface 38. The configuration illustrated in FIG. 6 enables further reduction of the vibration transmitted from the side of the second surface 39 of the seating surface to the supporting member 22. Note that the present disclosure also includes a configuration in which the recess 36 is not formed in the first surface 38 of the seating surface, the piezoelectric sensor 15 is simply disposed on the pad 21, and the recess 37 is formed in at least part of an area of the second surface 39 opposite an area of the first surface 38 on which the pad 21 is in contact with the piezoelectric sensor 15.

Figure 7:
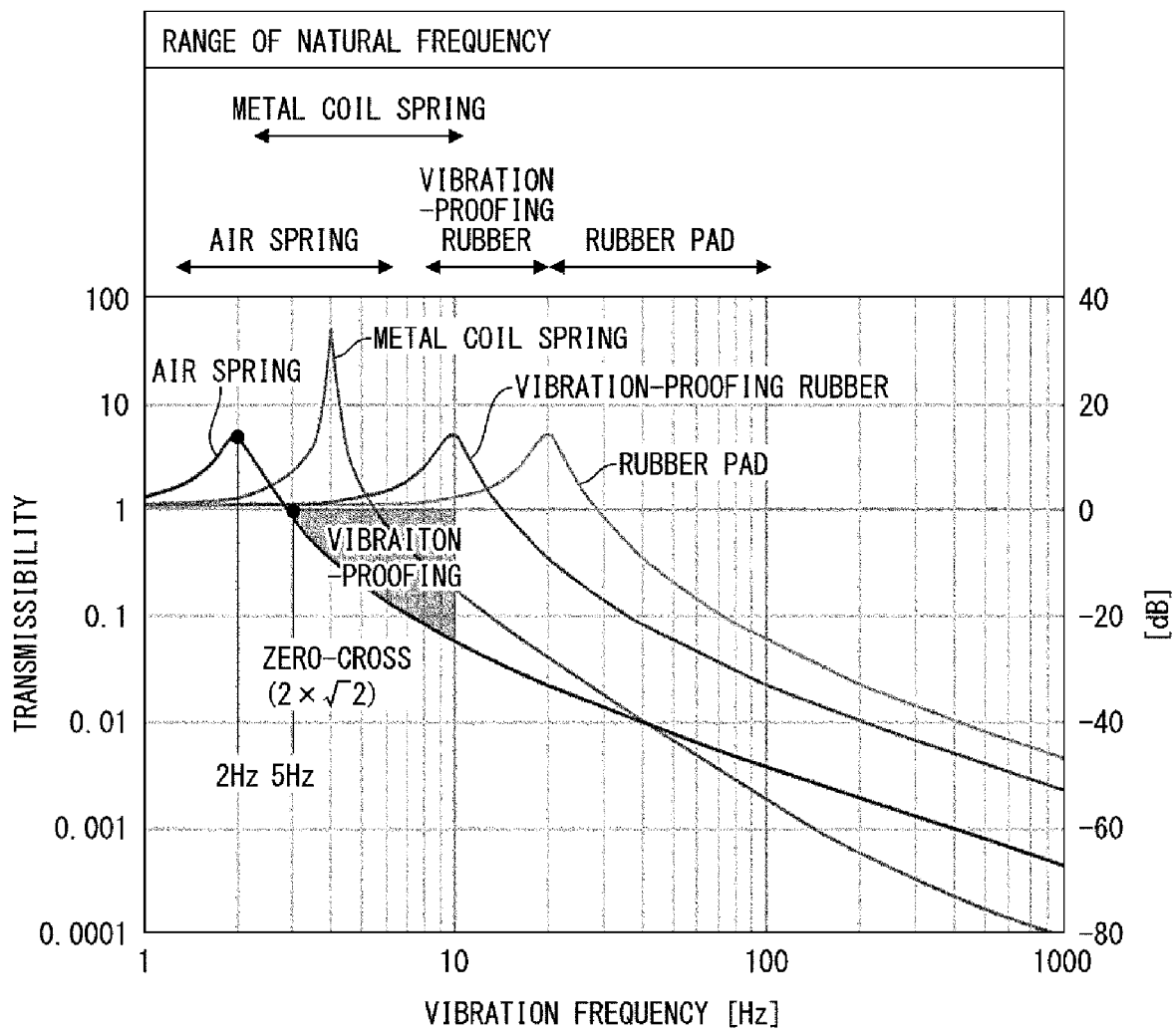
FIG. 7 is a graph showing an example of a relationship between a vibration frequency of vibration transmitted to a vibration-proofing material and a transmissibility of each kind of vibration-proofing materials.

FIG. 7 is a graph showing an example of a relationship between a vibration frequency of vibration transmitted to a vibration-proofing material and a transmissibility of each kind of vibration-proofing materials. In FIG. 7, the horizontal axis indicates the vibration frequency, and the vertical axis indicates the transmissibility. Here, the transmissibility means a ratio, to vibration transmitted from one object to the vibration-proofing material, of vibration transmitted from the vibration-proofing material to another object. In a case where a transmissibility corresponding to a vibration frequency of interest is less than 1, the vibration of the vibration frequency is attenuated. This allows the vibration-proofing material to produce the vibration-proofing effect. For example, in a case where the vibration-proofing material is an air spring, the vibration is amplified when the vibration frequency is less than $2 \times \sqrt{2}$, but the vibration is attenuated when the vibration frequency exceeds $2 \times \sqrt{2}$.

The accuracy of the measurement of a heart rate is greatly improved by reducing the vibration noise especially at vibration frequencies of a little less than 10 Hz. This is because the vibration noise especially at the vibration frequencies of a little less than 10 Hz interferes with the vibration caused by the heartbeat-induced body vibrations that are a target of the measurement. Thus, in the vibration-proofing materials exemplified in FIG. 7, the air spring or a metal coil spring is desirably used. The metal coil spring can reduce the vibration at vibration frequencies of not less than 40 Hz the most of all the vibration-proofing materials exemplified in FIG. 7. Further, a plurality of kinds of vibration-proofing materials may be combined for one recess of the seating surface.

Figure 8:
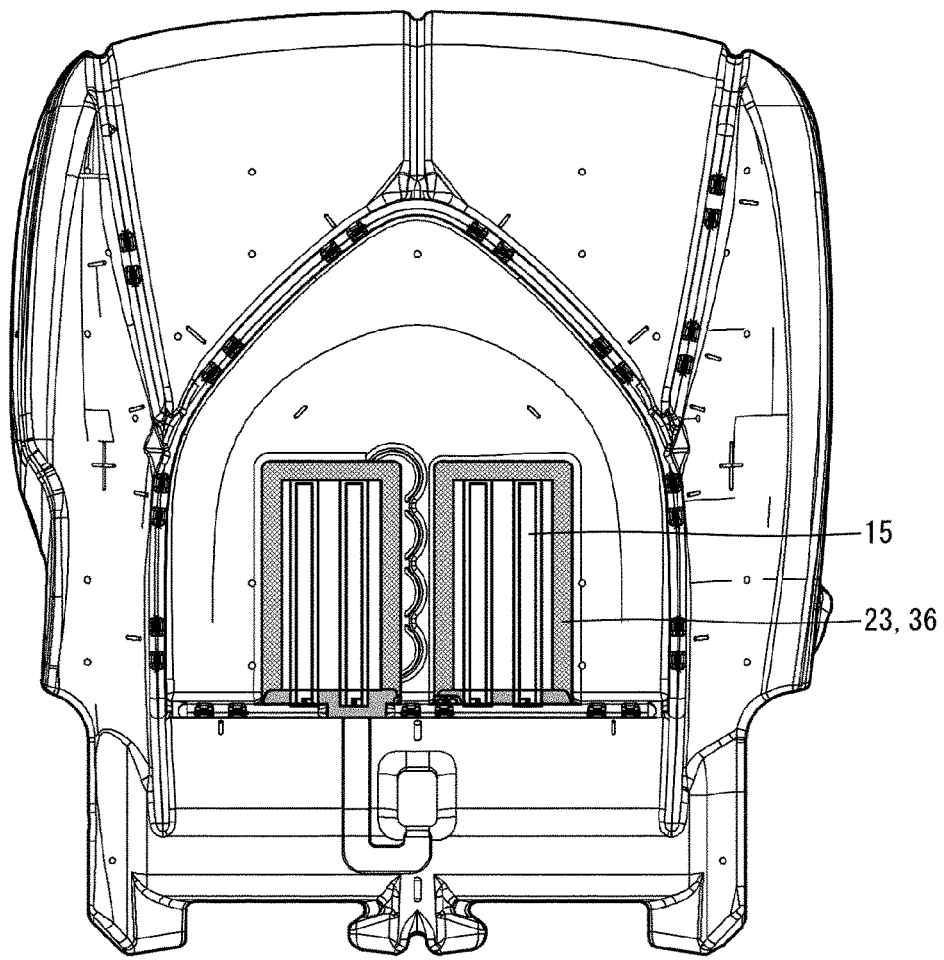
FIG. 8 is a drawing illustrating an example of a seating surface of a seat.

FIG. 8 is a drawing illustrating an example of a seating surface of a seat 1. In an example illustrated in FIG. 8, the seat 1 has a plurality of configurations in which a plurality of supporting members 22 that are not illustrated and a plurality of piezoelectric sensors 15 are provided at areas surrounded by a groove, which is a gap 23. That is, the seat 1 in FIG. 8 has a plurality of configurations in which a plurality of supporting members 22 are disposed inside a single recess 36 and support the corresponding piezoelectric sensors 15 on a one-to-one basis.

In the configuration exemplified in FIG. 8, a controller 17 included in a moving body may measure a heart rate of a sitter by referring to sensing results from the plurality of piezoelectric sensors 15. For example, the controller 17 may calculate the heart rate of the sitter with use of a mean value of the number of heartbeat-induced body vibrations sensed by each of the plurality of piezoelectric sensors 15. Note that, the shape of the recess 36 of the seating surface is not limited to a specific shape, but may be, for example, a rectangle and an ellipse when viewed from a side facing the seating surface.

Figure 9:
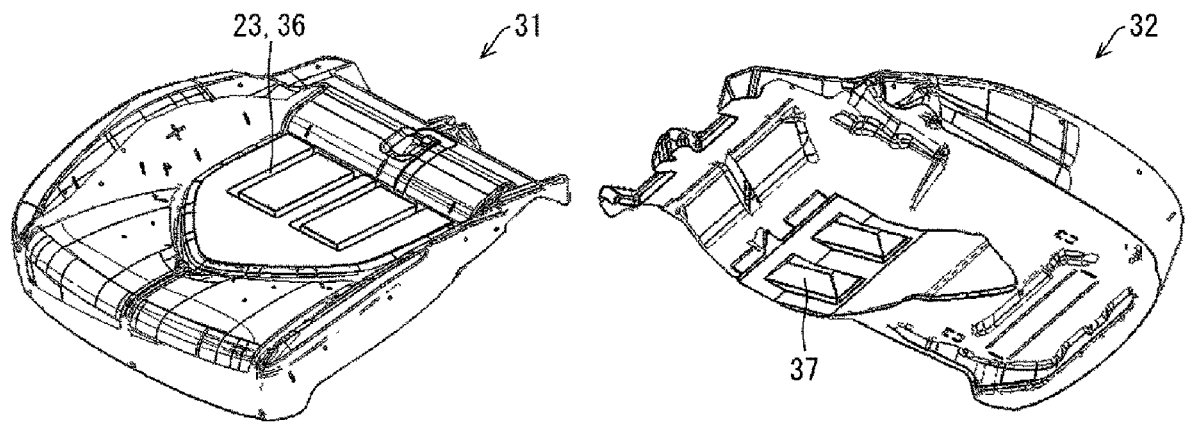
FIG. 9 is a view illustrating solid figures representing examples of a seating surface of a seat.

Each of solid FIGS. 31 and 32 in FIG. 9 represents an example of the seating surface of the seat 1. The solid FIG. 31 represents a first surface 38, which is a top surface of the seating surface, and corresponds to the drawing in FIG. 8. The solid FIG. 32 represents a second surface 39, which is a bottom surface of the seating surface, and corresponds to a cross-sectional view in FIG. 6.

Note that the piezoelectric sensor 15 and the supporting member 22 do not necessarily need to be provided on the seating surface of the seat 1, but may be provided on the back surface or on both the seating surface and the back surface. From a different point of view, in the description of the seating surface of the seat 1 in accordance with the present disclosure, the "seating surface" may be construed as indicating "back surface" or "seating surface or back surface".

In addition, in the configuration in which the piezoelectric sensor 15 is provided on the back surface of the seat 1, the vibration-proofing material 16 may be provided in an area located on either or both of (i) a side that is vertically below the supporting member 22 and (ii) a side closer to a surface of the back surface which surface is located opposite a surface thereof located on a side of a body of a sitter.

Note that the seat 1 does not necessarily need to include both the seating surface and the back surface, but may include only one of them. Further, the present disclosure also includes a bed, a mat, and the like each having the configuration exemplified in FIG. 4 in a manner similar to the seat 1.

Figure 10:
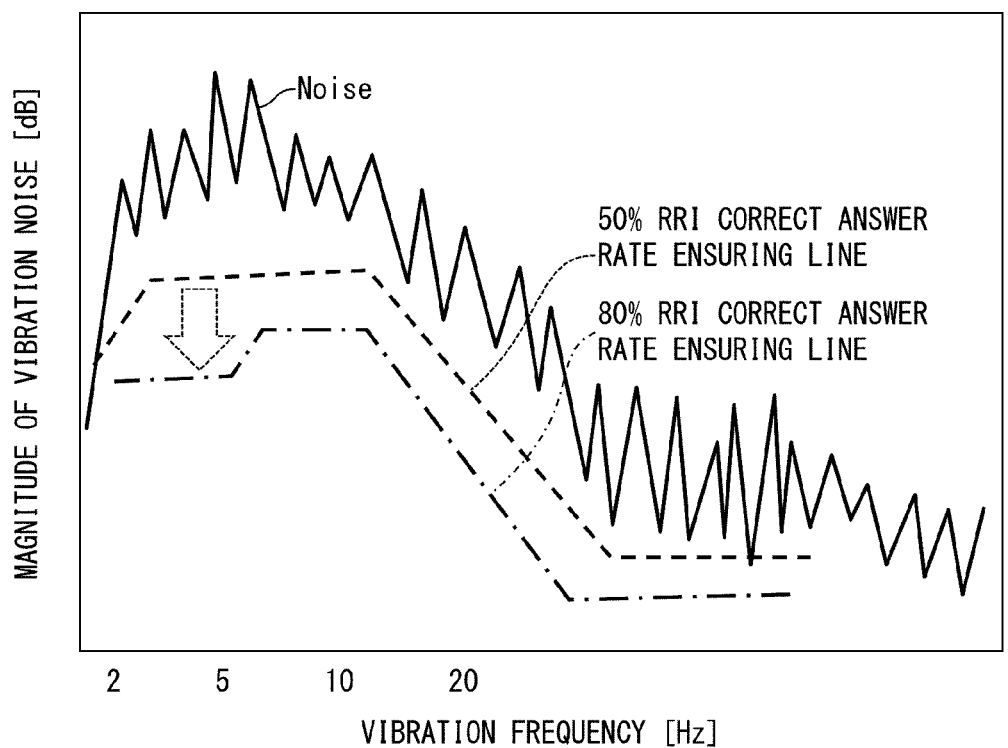
FIG. 10 is a graph showing an example of a relationship between a vibration frequency of vibration noise, a magnitude of vibration noise, and an RRI correct answer rate.
Figure 11:
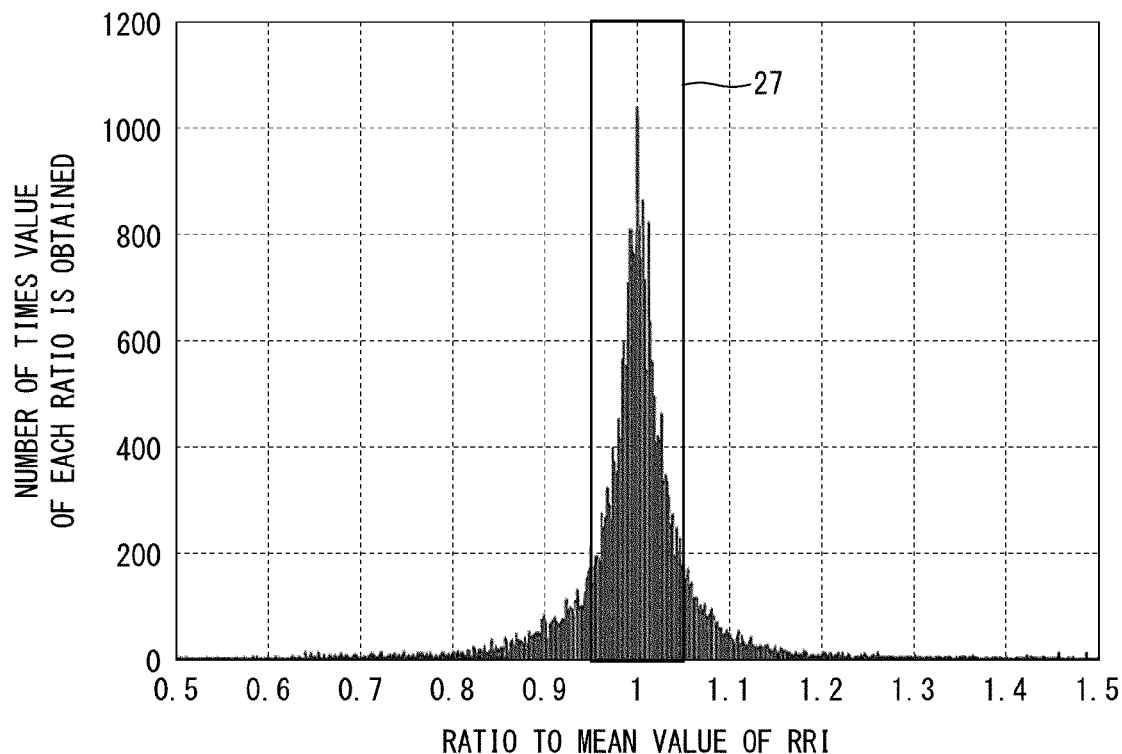
FIG. 11 is a view illustrating an example of a distribution chart for explaining an RRI correct answer rate.

FIG. 10 is a graph showing an example of a relationship between a vibration frequency of vibration noise, a magnitude of vibration noise, and an RRI correct answer rate. In FIG. 10, the horizontal axis indicates the vibration frequency of vibration noise, and the vertical axis indicates the magnitude of the vibration noise. FIG. 11 is a view illustrating an example of a distribution chart for explaining the RRI correct answer rate. The horizontal axis in FIG. 11 indicates a value of a ratio of each R-R interval (RRI) to the mean value of RRI (an average RRI) of heartbeat-induced body vibrations in a predetermined period, and the vertical axis indicates the number of times the value of each ratio is obtained. From a different point of view, FIG. 11 indicates a distribution of "rri/mean(rri)". Here, the denominator of "mean(rri)" means the mean value of RRI in a predetermined period, and the numerator of "rri" means the value of each RRI of interest. Note that the above-described predetermined period is not limited to a specific period, but may be, for example, 5 minutes and 30 minutes.

In a case where the value of the above ratio is close to 1, the value of the RRI of interest has a high reliability because the value of the RRI of interest is close to the mean value, and in a case where the value of the above ratio is greatly different from 1, the value of the RRI of interest has a low reliability. In the measurement of a heart rate, removing or adjusting the value of the RRI having a low reliability enables an improvement in the measurement accuracy.

The RRI correct answer rate means a percentage of RRIs whose values of the above ratio fall within a predetermined range with respect to the RRIs measured in a predetermined period. Normally, the predetermined range is determined to be a certain range that centers on 1 as the value of the above ratio. A frame 27 in FIG. 11 is an example of the predetermined range and indicates a range such that the value of the above ratio is 0.95 to 1.05.

For example, in FIG. 11, the RRI correct answer rate of 50% means that the values of the above ratio corresponding to 50% of the number of times of the RRIs measured in a predetermined period falls within the range of the frame 27.

When a controller 17 calculates a heart rate of a sitter, if the value of RRI of interest falls within the predetermined range, the controller 17 may use the value of RRI of interest as it is, and if the RRI of interest does not fall within the predetermined range, the controller 17 may use the value of RRI measured at the previous time.

Note that, as another aspect, the value of the ratio that the controller 17 uses when calculating the RRI correct answer rate may be a value of a ratio of the RRI measured at the current time to the RRI measured at the previous time. In such a configuration, a distribution chart corresponding to FIG. 11 indicates a distribution of "rri(k)/rri(k−1)". Here, the denominator of "rri(k−1)" indicates the value of the RRI measured at the (k−1)th time, which is the previous time of a kth time, and the numerator of "rri(k)" indicates the value of the RRI measured at the kth time, which is the current time.

Note that the controller 17 may use, as a value of RRI to be used for calculation of a heart rate, a new estimation value x(k) calculated by the following formula using the measured value of RRI of the current time, y(k), and the estimation value of the previous time, x(k−1).

$$x(k) = w \times y(k) + (1-w) \times x(k-1)$$

wherein w is a weighing coefficient determined according to a dispersion value or the like in the distribution chart, and may be $0 \leq w \leq 1$. The controller 17 may calculate a value of an initiation value, x(0), which is a base of the estimation value x using, for example, cepstrum analysis. Note that the controller 17 may reset the value of the initiation value x(0) every time a main power supply of a moving body is turned on or at regular time intervals.

As shown in FIG. 10, in any frequency band, reducing the vibration noise transmitted to the piezoelectric sensor 15 increases the RRI correct answer rate. That is, reducing the electric potential of the piezoelectric sensor 15 corresponding to vibration noise, the electric potential being input to the controller 17, facilitates separation of an electric signal waveform of heartbeat-induced body vibrations, improving the accuracy in extracting the feature amount of RRI. This results in the improvement in the accuracy of the heart rate measurement.

Further, when the heart rate of the sitter calculated on the basis of the sensing result from the piezoelectric sensor 15 indicates that the sitter has a problem, the controller 17 performs a predetermined process, such as a process to notify the sitter of the problem. In a broad sense, in case that the sensing result from the piezoelectric sensor 15 satisfies a predetermined condition on the heartbeat-induced body vibrations of the sitter, the controller 17 performs the predetermined process. Here, the case that the sensing result from the piezoelectric sensor 15 satisfies the predetermined condition may be, for example, a case that the heart rate of the sitter in a predetermined period is not more than a lower limit or not less than an upper limit and a case that the heart rate of the sitter has changed to be equal to or more than criterion value.

Further, the controller 17 may perform, as the predetermined process, the process involving output of a signal for notifying the information on a state of the sitter. Examples of such a process include:

a process to output a sound, an image, light, and/or a text in order to provide, to a sitter, a notification that the sitter feels sleepiness, excitement or fatigue;

a process to output a control signal to move the seat and/or other movable part included in the moving body, in order to provide, to a sitter, a notification that the sitter feels sleepiness, excitement or fatigue; and a process to transmit the information indicating that a sitter has a problem to a predetermined contact information through radio wave communications or the like.

The controller 17 may also perform, as a predetermined process, a process involving movement of the moving body. Examples of such a process include:

a process to stop a moving body at a breakdown lane or the like;

a process to decrease the speed of a moving body; and a process to move a moving body to a predetermined place, such as a hospital and a home.

Further, in a case where a predetermined condition on heartbeat-induced body vibrations of a sitter is satisfied, the controller 17 may perform, as the predetermined process, both of the above-described process to output a signal for notifying the information on the state of the sitter and the above-described process involving movement of the moving body.

Software Implementation Example

The functions of the controller 17 (hereinafter, referred to as "device") included in a moving body in accordance with the present disclosure can be realized by a program for causing a computer to function as the device, the program causing the computer to function as the control blocks of the device.

In this case, the device includes a computer that has at least one control device (for example, a processor) and at least one memory device (for example, a memory) as hardware for executing the program. The control device and the memory device execute the program, so that the functions described in the above embodiments are realized.

The program can be stored in one or more non-transitory computer-readable storage mediums. The storage medium can be provided in the device, or the storage medium does not need to be provided in the device. In the latter case, the program can be supplied to the device via any wired or wireless transmission medium.

Some or all of the functions of the control blocks can be realized by a logic circuit. For example, an integrated circuit in which a logic circuit that functions as each of the control blocks is formed is also encompassed in the scope of the present disclosure. In addition, the function of each of the control blocks can be realized by, for example, a quantum computer.

Further, each of the processes described in the above embodiments can be executed by artificial intelligence (AI). In this case, the AI may be operated by the control device or may be operated by another device (for example, an edge computer and a cloud server).

The present disclosure is not limited to the embodiments, but can be altered by a skilled person in the art within the scope of the claims. The present disclosure also encompasses, in its technical scope, any embodiment derived by combining technical means disclosed in differing embodiments.

SUMMARY

A seat in accordance with Aspect 1 of the present disclosure is a seat provided in a moving body, the seat including: at least one piezoelectric sensor including a first surface located on a side of a body of a sitter and a second surface located opposite the first surface, the piezoelectric sensor configured to sense heartbeat-induced body vibrations of the sitter through the first surface; and at least one supporting member disposed inside a recess which is formed in at least one of a seating surface of the seat and a back surface of the seat, the supporting member supporting the piezoelectric sensor under the second surface of the piezoelectric sensor, wherein a gap is provided in at least part of an area between a surface of the supporting member and an inner wall of the recess so that the surface of the supporting member and the inner wall of the recess do not come into contact with each other.

According to the above configuration, vibration from the seating surface or the back surface to the supporting member is intercepted by the gap. This makes it possible to, in a case where the sensor provided in the seat of the moving body senses heartbeat-induced body vibrations of the sitter to measure a heart rate of the sitter, prevent the accuracy of the measurement from being decreased by vibration occurring in the moving body.

In Aspect 2 of the present disclosure, the seat in accordance with Aspect 1 is configured such that a vibration-proofing material for supporting the supporting member and for preventing vibration from being transmitted from the seating surface or the back surface to the supporting member is provided in at least part of the gap.

According to the above configuration, the vibration-proofing material fixes the supporting member to the recess of the seat, and it is thus possible to prevent the transmission of the vibration from the seat to the supporting member.

In Aspect 3 of the present disclosure, the seat in accordance with Aspect 2 is configured such that the vibration-proofing material is an air spring, and the air spring supports the supporting member on a surface of the air spring which surface is located opposite a surface thereof that is in contact with the seating surface or the back surface.

According to the above configuration, the air spring fixes the supporting member to the recess of the seat, and it is thus possible to prevent the transmission of vibration mainly in a specific vibration frequency band from the seat to the supporting member.

In Aspect 4 of the present disclosure, the seat in accordance with Aspect 2 is configured such that the vibration-proofing material is a package enclosing a powder and granular material, and the package supports the supporting member on a surface of the package which surface is located opposite a surface thereof that is in contact with the seating surface or the back surface.

According to the above configuration, the powder and granular material fixes the supporting member to the recess of the seat, and it is thus possible to prevent the transmission of vibration mainly in a specific vibration frequency band from the seat to the supporting member.

In Aspect 5 of the present disclosure, the seat in accordance with any one of Aspects 2 to 4 is configured such that at least one of a contact surface where the vibration-proofing material and the supporting member are in contact with each other and a contact surface where the vibration-proofing material and the recess of the seating surface or the back surface are in contact with each other is a plurality of contact surfaces.

According to the above configuration, the vibration transmitted from the seating surface or the back surface to the supporting member is dispersed. This makes it possible to further prevent the accuracy of the measurement of a heart rate from being decreased.

In Aspect 6 of the present disclosure, the seat in accordance with any one of Aspects 1 to 5 is configured such that the at least one piezoelectric sensor comprises a plurality of piezoelectric sensors, and the at least one supporting member comprises a plurality of supporting members corresponding one-to-one to the plurality of piezoelectric sensors, and the plurality of supporting members are disposed inside the single recess and support the corresponding piezoelectric sensors on a one-to-one basis.

According to the above configuration, decreasing the number of recesses in the seat contributes to simplification of the structure of the seat.

In Aspect 7 of the present disclosure, the seat in accordance with Aspect 1 is configured such that the supporting member is disposed on a net stretched between opposite positions of the inner wall of the recess, and is supported by the net.

According to the above configuration, it is possible to further reduce vibration transmitted from vertically below the supporting member of the seating surface or the back surface to the supporting member.

In Aspect 8 of the present disclosure, the seat in accordance with any one of Aspects 1 to 7 is configured such that the first surface of the piezoelectric sensor and a surface of the seating surface or the back surface form a substantially flat surface.

According to the above configuration, it is possible to reduce uncomfortableness that the sitter feels when the sitter sits the seat.

In Aspect 9 of the present disclosure, the seat in accordance with any one of Aspects 1 to 8 is configured such that the seating surface or the back surface includes a first surface located on a side of a body of a sitter and a second surface located opposite the first surface of the seating surface or the back surface, the recess inside which the supporting member is disposed is formed in the first surface of the seating surface or the back surface, and the seating surface or the back surface has a recess formed in the second surface thereof in at least part of an area which is located opposite the recess inside which the supporting member is disposed.

According to the above configuration, it is possible to further reduce vibration transmitted to the supporting member especially in a case where the supporting member is disposed on the seating surface.

In Aspect 10 of the present disclosure, the seat in accordance with any one of Aspect 1 to 9 is configured such that, in a case where a sensing result from the piezoelectric sensor satisfies a predetermined condition on the heartbeat-induced body vibrations of the sitter, a controller included in the moving body performs at least one of a process to output a signal for notifying information on a state of the sitter and a process involving movement of the moving body.

According to the above configuration, it is possible to perform control to output a warning by sound output, in a case where, for example, the sensing result indicates that a driver of the moving body feels sleepiness.

REFERENCE SIGNS LIST

1 Seat
15 Piezoelectric sensor
16 Vibration-proofing material
17 Controller
22 Supporting member
23 Gap
25 Net
34 First surface of piezoelectric sensor
35 Second surface of piezoelectric sensor
36, 37 Recess
38 First surface of seating surface
39 Second surface of seating surface

The invention claimed is:

1. A seat provided in a moving body, the seat comprising:
at least one piezoelectric sensor including a first surface located on a side configured to receive a hip or torso of a sitter and a second surface located opposite the first surface, the piezoelectric sensor configured to sense heartbeat-induced body vibrations of the sitter through the first surface; and
at least one supporting member disposed inside a recess which is formed in at least one of a seating surface of the seat and a back surface of the seat, the supporting member supporting the piezoelectric sensor under the second surface of the piezoelectric sensor, wherein
a gap is provided in at least part of an area between a surface of the supporting member and an inner wall of the recess so that the surface of the supporting member and the inner wall of the recess do not come into contact with each other.

2. The seat according to claim 1, wherein
a vibration-proofing material for supporting the supporting member and for preventing vibration from being transmitted from the seating surface or the back surface to the supporting member is provided in at least part of the gap.

3. The seat according to claim 2, wherein:
the vibration-proofing material is an air spring; and
the air spring supports the supporting member on a surface of the air spring which surface is located opposite a surface thereof that is in contact with the seating surface or the back surface.

4. The seat according to claim 2, wherein:
the vibration-proofing material is a package enclosing a powder and granular material; and
the package supports the supporting member on a surface of the package which surface is located opposite a surface thereof that is in contact with the seating surface or the back surface.

5. The seat according to claim 2, wherein
at least one of a contact surface where the vibration-proofing material and the supporting member are in contact with each other and a contact surface where the vibration-proofing material and the recess of the seating surface or the back surface are in contact with each other is a plurality of contact surfaces.

6. The seat according to claim 1, wherein:
the at least one piezoelectric sensor comprises a plurality of piezoelectric sensors, and the at least one supporting member comprises a plurality of supporting members corresponding one-to-one to the plurality of piezoelectric sensors; and
the plurality of supporting members are disposed inside the single recess and support the corresponding piezoelectric sensors on a one-to-one basis.

7. The seat according to claim 1, wherein
the supporting member is disposed on a net stretched between opposite positions of the inner wall of the recess, and is supported by the net.

8. The seat according to claim 1, wherein
the first surface of the piezoelectric sensor and a surface of the seating surface or the back surface form a substantially flat surface.

9. The seat according to claim 1, wherein:
the seating surface or the back surface includes a first surface located on a side configured to receive a hip or torso of the sitter and a second surface located opposite the first surface of the seating surface or the back surface;
the recess inside which the supporting member is disposed is formed in the first surface of the seating surface or the back surface; and
the seating surface or the back surface has a recess formed in the second surface thereof in at least part of an area which is located opposite the recess inside which the supporting member is disposed.

10. The seat according to claim 1, wherein
in a case where a sensing result from the piezoelectric sensor satisfies a predetermined condition on the heartbeat-induced body vibrations of the sitter, a controller included in the moving body performs at least one of a process to output a signal for notifying information on a state of the sitter and a process involving movement of the moving body.

* * * * *